W. J. CLARKE.
SPRAY PUMP AND TANK.
APPLICATION FILED NOV. 18, 1911.

1,069,767.   Patented Aug. 12, 1913.

Witnesses
Edwin G. McKee
Alfred G. Seiler

Inventor
William J. Clarke
By Geo. W. Suls
Attorney

UNITED STATES PATENT OFFICE.

WILLIAM J. CLARKE, OF MONTREAL, MISSOURI.

SPRAY-PUMP AND TANK.

1,069,767.

Specification of Letters Patent. Patented Aug. 12, 1913.

Application filed November 18, 1911. Serial No. 660,943.

*To all whom it may concern:*

Be it known that I, WILLIAM J. CLARKE, a citizen of the United States, and a resident of Montreal, in the county of Camden and State of Missouri, have invented certain new and useful Improvements in Spray-Pumps and Tanks, of which the following is a specification, reference being had to the accompanying drawings.
This invention relates to improvements in combined spray pumps and tanks.

The primary object of my invention is to provide a spray pump adapted to be attached to a wheeled vehicle or agricultural machine, and having means whereby the pumping mechanism is geared to and operated by one of the wheels of the vehicle.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

Figure 1:
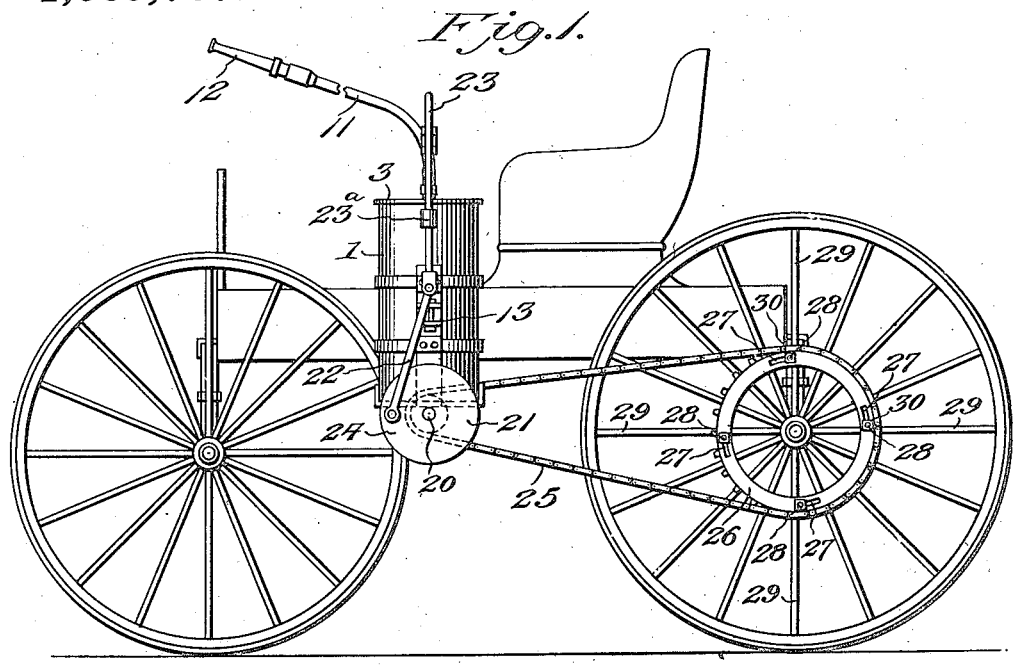
Figures 2, 3:
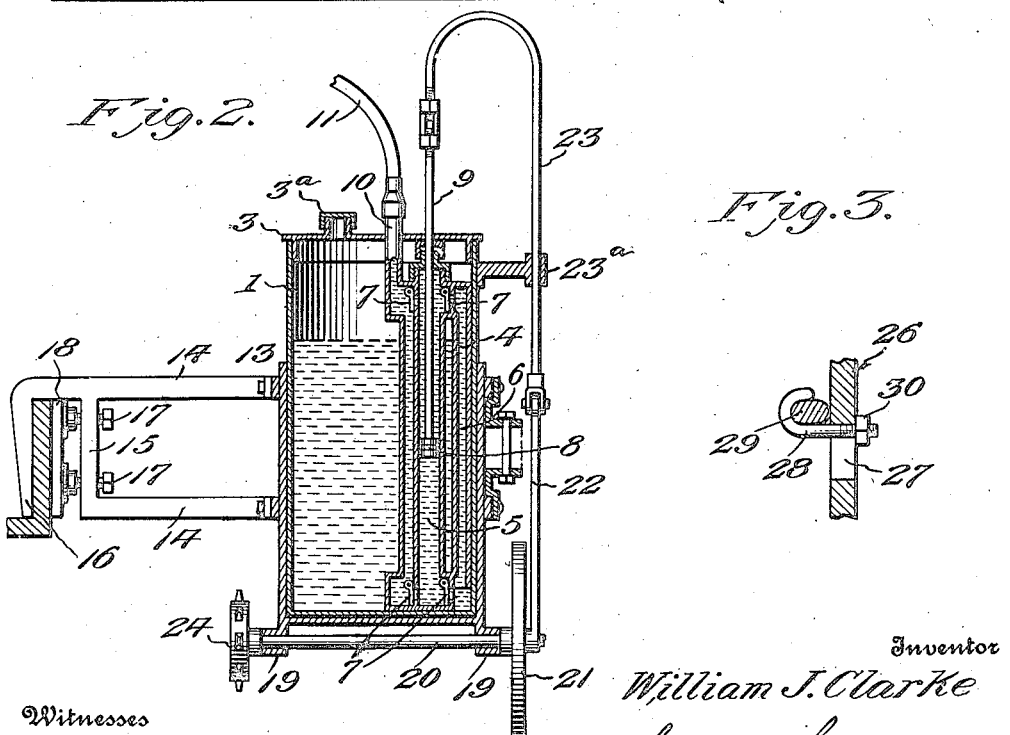

In the accompanying drawings forming a part of this specification and in which like numerals of reference indicate similar parts in the several views: Figure 1, is a side view of a buggy showing the invention applied thereto. Fig. 2, is a central vertical longitudinal sectional view of the tank and pump showing the means for attaching the same to a vehicle. Fig. 3, is a detail cross sectional view through a spoke of one of the vehicle wheels and a portion of the pump operating gear, showing the manner in which the gear is secured to the spokes.
In the embodiment of the invention, I provide a tank 1 which may be of any suitable size and shape, and is here shown as of cylindrical form having a removable cover 3, in which is arranged a filling opening closed by a cap 3ª.

Arranged in the tank 1 is a pump 4, which is here shown and is preferably a double acting force pump comprising an inner suction chamber or cylinder 5, and an outer accumulating chamber 6, said chamber being provided with suitably arranged check valves 7, whereby the passage of the fluid to and from the same is controlled. In the chamber or cylinder 5 is arranged the piston 8, having a piston rod 9 which works through a stuffing box on the upper end of the pump and through the top of the tank, as shown. Connected to the upper end of the chamber 6 is a discharge spout 10, which extends upwardly through the top of the tank and has attached thereto a flexible spray pipe 11, which may be of any desired length, and is provided on its outer end with a spray or other form of nozzle 12.

In connection with the tank I provide a suitable supporting frame 13, having means whereby the same is attached to a vehicle body or to any agricultural machine to support the tank and pump.

In the present instance, the pump is shown as applied to a buggy and the means for attaching the tank and pump supporting frame comprises upper and lower parallel supporting bars 14, connected together at their outer ends by an integral cross bar 15, and having formed thereon a clamping arm 16. In the cross bar 15 are arranged clamping screws 17, adapted to be screwed up against a clamping plate 18. In applying the attaching mechanism to a buggy, the arms 16 and clamping plate 18 are engaged with the sides of the buggy body, as clearly shown in Fig. 2 of the drawings, after which the clamping screws 17 are tightened up, thereby securely fastening the supporting frame to the vehicle. On the lower end of the supporting frame are formed bearings 19, in which is revolubly mounted a pump operating shaft 20, having on its outer end a crank disk or wheel 21, to which is eccentrically connected one end of a pitman rod 22, the other end of which is connected by a curved operating arm 23, to the upper end of the piston rod 9 of the pump, said arm working through a guide bracket 23ª, on the tank. The shaft 20 may be geared to one of the wheels of the vehicle in any suitable manner and is here shown as having on its inner end a sprocket gear 24, which is connected by a sprocket chain 25, to a sprocket gear 26, which is preferably in the form of a flat ring having on its outer edge gear teeth and having formed therein segmental slots 27, with which are engaged hook bolts 28. The inner ends of the bolts 28 are engaged with the spokes 29 of the wheel, while on the threaded outer ends are arranged clamping nuts 30, which when tightened up draw the hook and ring into tight engagement with the spokes. By providing the slots 27 for the clamping bolts, the latter may be adjusted to a limited extent, thus permitting the gear to be secured to wheels having spokes at different distances apart. By thus connecting the pumping mechanism to a wheel of the vehicle, it will be seen that an efficient power is provided for operating the pump and while the pump is shown in the present instance as being applied to a buggy, it is obvious that the same may be applied to a cultivator or any other wheeled agricultural machine, and the spraying operation performed simultaneously with the cultivation of the plants.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent is:

A pump attachment for a vehicle comprising a frame, bars extending from one side of the frame, a clamp carried by the bars, bearings carried at the bottom of the frame, a shaft journaled in the bearings, a tank located in the frame, a pump located in the tank and means for operating the pump from the shaft.

In testimony whereof I affix my signature, in presence of two witnesses.

WILLIAM J. CLARKE.

Witnesses:
C. E. FOWLER,
J. E. FOWLER.